United States Patent
Pecen et al.

(10) Patent No.: US 7,136,641 B2
(45) Date of Patent: Nov. 14, 2006

(54) ALTERNATIVE NETWORK SELECTION FOR A COMMUNICATION DEVICE

(75) Inventors: Mark E. Pecen, Palatine, IL (US);
Niels Peter Skov Andersen, Roskilde (DK); Sanjay Gupta, Lakewood, IL (US); Ravi Kuchibhotla, Gurnee, IL (US)

(73) Assignee: Motorola Inc., Schaumburg, IL (US)

( * ) Notice: Subject to any disclaimer, the term of this patent is extended or adjusted under 35 U.S.C. 154(b) by 377 days.

(21) Appl. No.: 10/803,683

(22) Filed: Mar. 18, 2004

(65) Prior Publication Data
US 2005/0208938 A1    Sep. 22, 2005

(51) Int. Cl.
*H04Q 7/20* (2006.01)
*H04Q 7/38* (2006.01)

(52) U.S. Cl. ............... 455/428; 455/421.1; 455/426.2; 455/435.1; 455/552.1; 455/550.1; 455/422.1; 455/435.2

(58) Field of Classification Search ............ 455/428, 455/552.1, 550.1, 466, 422.1, 403, 426.1, 455/426.2, 414.1, 435.1, 435.2, 435.3, 500, 455/517, 445, 551, 414.4, 41.1, 41.2
See application file for complete search history.

(56) References Cited

U.S. PATENT DOCUMENTS

2002/0191575 A1 * 12/2002 Kalavade et al. .......... 370/338
2006/0013157 A1 * 1/2006 Annic ....................... 370/328
2006/0018283 A1 * 1/2006 Lewis et al. ............... 370/331

FOREIGN PATENT DOCUMENTS

WO    WO 01/67684 A2    9/2001

OTHER PUBLICATIONS

"3rd Generation Partnership Project; Technical Specification Group GSM/EDGE Radio Access Network; Radio subsystem link control (Release 4)", 3GPP TS 45.008 V4.13.0 (Nov. 2003) Technical Specification, 101 pages.
3rd Generation Partnership Project; Technical Specification Group Core Network; Mobile radio interface Layer 3 specification; Core network protocols; Stage 3 (Release 4), 459 pages.

* cited by examiner

*Primary Examiner*—Keith Ferguson
(74) *Attorney, Agent, or Firm*—Joseph T. Cygan (57) ABSTRACT

Methods (200) and apparatus (700) for providing an access to a first communication network (102) through a second communication network (106) by a communication device (108) are disclosed. The communication device (108) having a first identification and supporting a cellular core network signaling protocol of the first communication network (102), upon entering the second communication network, is assigned a second identification by the second communication network (106). The communication device (108) communicates with the first communication network (102) through an alternative network controller (104) utilizing the second communication network (106). Method (500) for providing an access to a preferred communication network out of a plurality of communication networks based upon a predetermined condition is also provided.

16 Claims, 7 Drawing Sheets

ALTERNATIVE NETWORK SELECTION FOR A COMMUNICATION DEVICE

FIELD OF THE INVENTION

The present invention generally relates to alternative network selections, and more specifically to a method and an apparatus for providing an access by a communication device to a communication network through an alternative network.

BACKGROUND OF THE INVENTION

When a cellular wireless mobile communication device is first switched on, its receiver scans an allocated radio frequency ("RF") spectrum for appropriate signals from base stations in a network that may provide service. Once the cellular wireless mobile communication device has identified and synchronized to a group of base stations, it ranks RF characteristics associated with each of the identified base stations in order of filtered signal strength. The cellular wireless mobile communication device then selects the base station having the strongest filtered signal strength on which to "camp." Camping on a base station refers to the reading of broadcast information for monitoring paging messages that alert the cellular wireless mobile communication device of an incoming call. Once the cellular wireless mobile communication device camps on a base station, a signaling sequence, referred to as a routing area ("RA") update, is exchanged between the network and cellular wireless mobile communication device. The RA update informs the network of a subgroup of base stations available in a RA which include the base station on which the cellular wireless mobile communication device is camping. The RA update assists the network in determining how to reach the cellular wireless mobile communication device. For example, when a subscriber number is called, the network must determine how a mobile switching centre ("MSC") routes a paging message to the cellular wireless mobile communication device.

In a typical cellular system, the cellular wireless mobile communication device does not provide the network with its location information, such as a cell identifier, every time it selects a new cell. Because the radio wave propagation is highly sensitive to changes in the physical environment even in an environment where the RF coverage is very good, cell reselection occurs frequently. Therefore, if the cellular wireless mobile communication device were to inform the network for every cell reselection, signaling between the cellular wireless mobile communication device and network would likely congest the control channels. Further, because signaling messages deliver no revenue to the operator of the network, signaling messages are maintained at a level that is as infrequent as practical. When the MSC receives a call from an outside party who desires to reach the cellular wireless mobile communication device, or its user, the MSC looks up the logical location of the cellular wireless mobile communication device indicated by the RA, and sends a paging message only to a base station controller ("BSC") in the RA. The BSC then sends paging messages on control channels only to the base station identified in the RA. The cellular wireless mobile communication device then receives the paging message and alerts the user of the incoming call.

Generally, the cellular wireless mobile communication device acts autonomously and simply listens to the broadcast control channels ("BCCH"), which include paging messages, of each cell. However, to provide the location information of the cellular wireless mobile communication device as it travels through the network, the cellular wireless mobile communication device sends an RA update message to the network whenever the cellular wireless mobile communication device crosses an RA boundary. This RA update procedure includes an authentication procedure to verify the cellular wireless mobile communication device as a valid subscriber. If the cellular wireless mobile communication device fails to send a RA update as it leaves one RA and enters into another, the network would send pages to the previous RA, and the cellular wireless mobile communication device would miss incoming calls. If the network fails to receive an RA update from the cellular wireless mobile communication device for some time, such as several hours to several days, the network will detach the cellular wireless mobile communication device from the network. The network may send to voice-mail any received calls for the cellular wireless mobile communication device after detaching. Most cellular systems have a periodic timer that causes the cellular wireless mobile communication device to perform the RA update at a predetermined time interval such as every two hours. An RA update procedure is additionally used when a cellular wireless mobile communication device changes its operating systems, or radio access technology, such as a change between a Global System for Mobile Telecommunication ("GSM") system and a Universal Mobile Telecommunication Service ("UMTS") system. The RA update is also performed when the cellular wireless mobile communication device returns to its idle mode from certain communication services such as Dual Transfer Mode ("DTM").

DETAILED DESCRIPTION OF THE PREFERRED EMBODIMENTS

The present invention generally provides a method and apparatus for providing an access by a communication device to a first communication network through a second communication network. The first communication network may typically be a cellular communication network such as, but not limited to, Third Generation ("3G"), Global System for Mobile Communications ("GSM"), or Code Division Multiple Access ("CDMA"); the communication device may be a cellular mobile communication device compatible with the first communication system or a communication device supporting a cellular core network signaling protocol of the first communication network; and the second communication network may be an unlicensed communication network such as, but not limited to, a wireless local area network ("WLAN"), which is less expensive to operate than a licensed cellular band and is capable of supporting a wideband data transfer. The communication device, upon entering the second communication network, communicates with the first communication network through an alternative network controller utilizing the second communication network, and operates normally.

Figure 1:
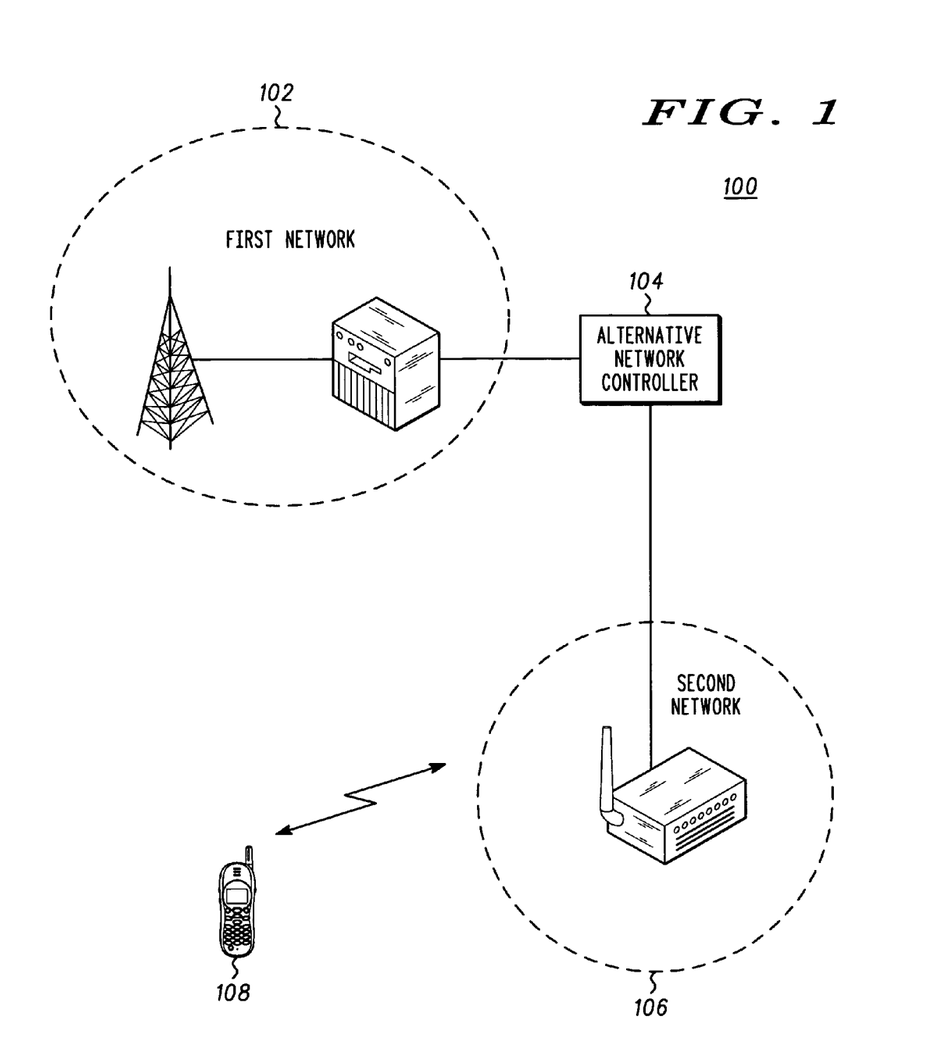
FIG. 1 is an exemplary block diagram of an embodiment of a communication system in accordance with the present invention.

FIG. 1 is an exemplary block diagram of an embodiment of a communication system in accordance with the present invention. The communication system 100 comprises a first communication network 102, which is illustrated as a cellular network. The first communication network 102 is coupled to an alternative network controller 104, which is coupled to a second communication network 106. The second communication network 106 is illustrated as wirelessly communicating with a communication device 108. The second communication network 106 may be one of many types of networks such as, but not limited to, an unlicensed communication network, a local area network ("LAN"), a wireless local area network ("WLAN"), a wideband network, an infrared network, and a short-range network.

Figure 2:
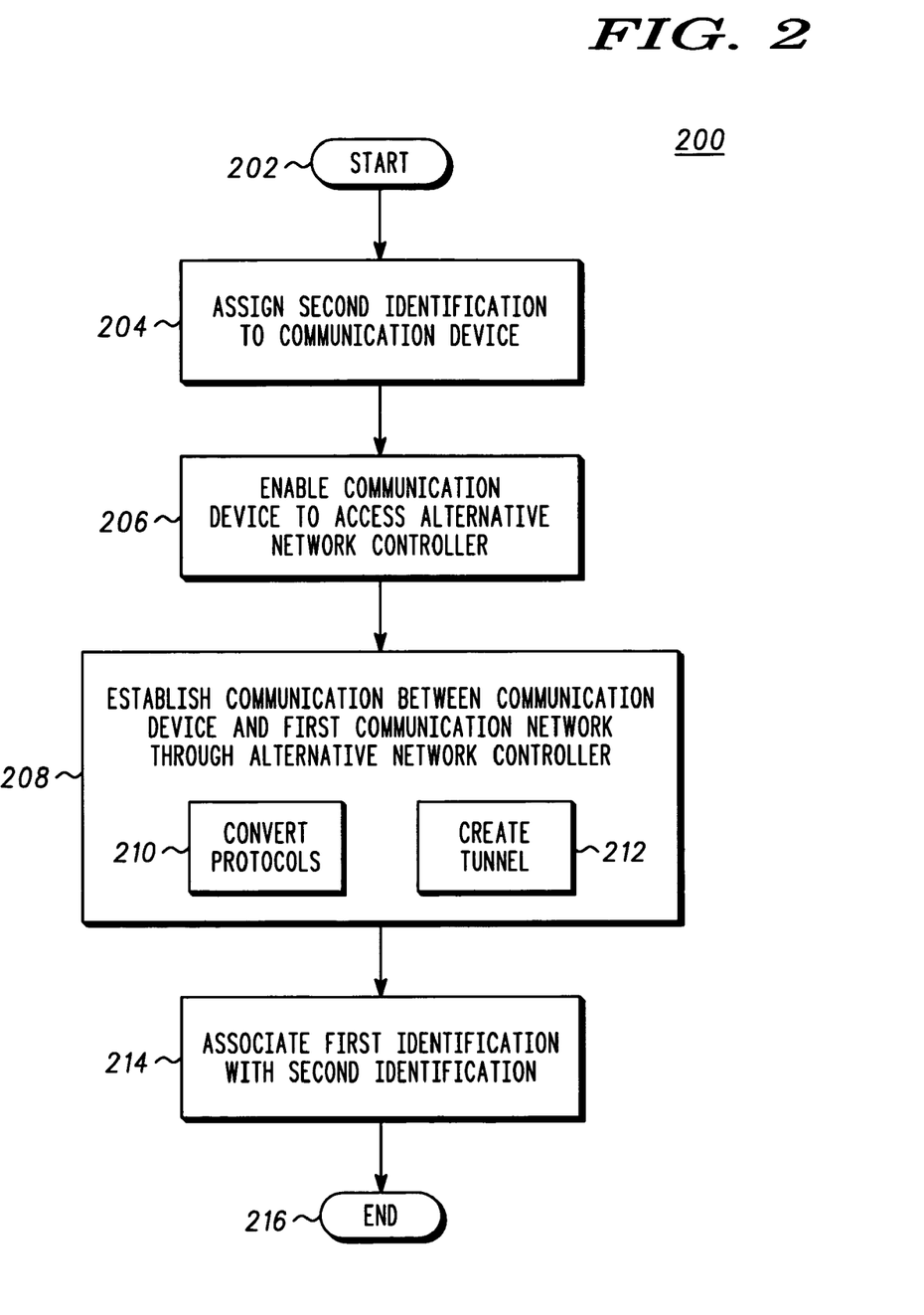
FIG. 2 is an exemplary flowchart illustrating a method in a communication system for providing an access by a communication device to a first communication network through a second communication network in accordance with the present invention.

FIG. 2 is an exemplary flowchart 200 illustrating a method in the communication system 100 for providing an access by the communication device 108 to the first communication network 102 through the second communication network 106 in accordance with the present invention. The first communication network 102 operates using a cellular core network signaling protocol, and the communication device 108 supports the cellular core network signaling protocol of the first communication network 102, and has a first identification such as an assigned telephone number, which is generally used to establish communication with the first communication network 102. The process begins in block 202, and the communication device 108 is assigned a second identification in block 204. The second communication network 106 may assign the second identification to the communication device 108 in response to a request to access the second communication network 106 transmitted from the communication device 108, and may authorize the communication device 108 to access the second communication network 106. The second identification assigned to the communication device 108 may be a temporary identification such as an IP address dynamically assigned by the second communication network 106.

Upon assigning the second identification, the second communication network 106 enables the communication device 108 to access the alternative network controller 104 in block 206. The alternative network controller 104 then establishes communication between the communication device 108 and the first communication network 102 through the alternative network controller 104 in block 208. As shown in block 210 within block 208, the alternative network controller 104 may establish communication by converting a protocol of the second communication network 106 into the cellular core network signaling protocol of the first communication network 102, and converting the cellular core network signaling protocol of the first communication network 102 into the protocol of the second communication network 106. As also shown in block 212, the alternative network controller 104 may also establish communication by creating and controlling a tunnel, which is an extra protocol addressing layer used to carry data, between the communication device 108 and the alternative network controller 104.

The alternative network controller 104 then associates the first identification of the communication device 108 with the second identification of the communication device 108 in block 214. This association of the first identification to the second identification enables the communication system 100 to re-direct services, originally directed to the first identification, to the second identification of the communication device 108. For example, by associating the assigned subscriber identity of the communication device 108 with the IP address assigned by the second communication network, the alternate network controller 104 can properly forward a call to the communication device 108 through the second communication network 106. Other services such as a short message service ("SMS") message and caller ID can also be properly forwarded, and the communication device 108 is also able to initiate and utilize any other function normally associated with services provided by the first communication network 102. In block 214, the alternative network controller 104 may further receive identification information of the second communication network 106 such as, but not limited to, a unique identifier, location information, a medium access control ("MAC") identification, a service set identifier ("SSID"), and an IP address, and may associate the identification information of the second communication network 106 with the first identification of the communication device 108. The process then terminates in block 216.

Figure 3:
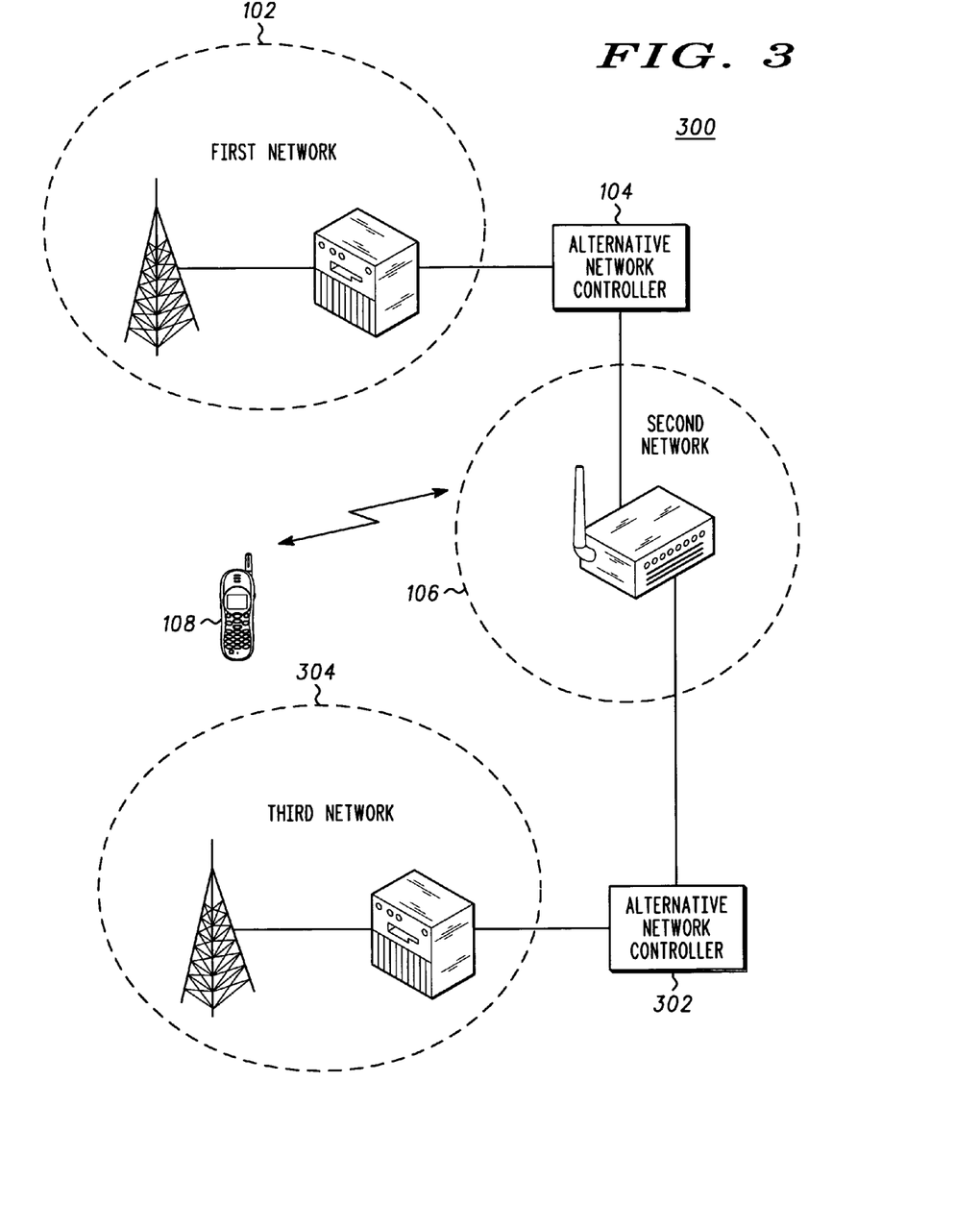
FIG. 3 is an exemplary block diagram of an embodiment having a plurality of communication networks and a plurality of alternative network controllers in accordance with the present invention.
Figure 4:
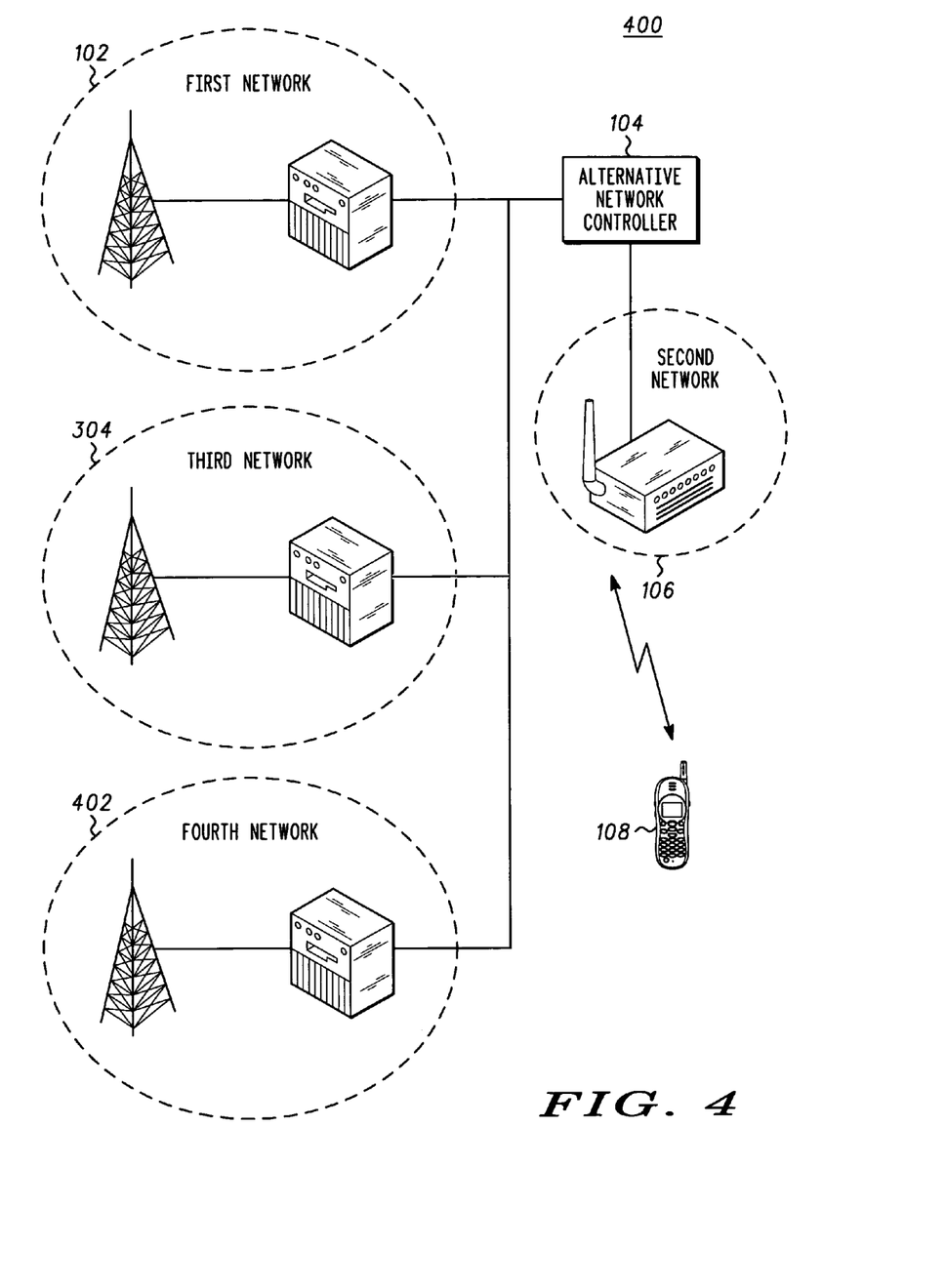
FIG. 4 is an exemplary block diagram of an embodiment having a plurality of communication networks connected to a single alternative network controller in accordance with the present invention.

FIG. 3 is an exemplary block diagram of an embodiment of a communication system 300 in accordance with the present invention. Compared to the communication system 100 of FIG. 1, the communication system 300 comprises a plurality of alternative network controllers (only one additional alternative network controller 302 is shown), each of which is connected to a corresponding communication network (only one additional communication network 304 is shown) of a plurality of communication networks. All alternative network controllers are coupled to the second communication network 106. The second communication network 106 is again illustrated to be coupled wirelessly with a communication device 108. In the environment illustrated in FIG. 3, the communication device 108 may be connected to either the first communication network 102 or the third communication network 304. Alternatively, as illustrated in FIG. 4, a communication system 400 may comprise a plurality of communication networks (only three communication networks 102, 304, and 402 are shown) connected to a single alternative network controller 104.

Figure 5:
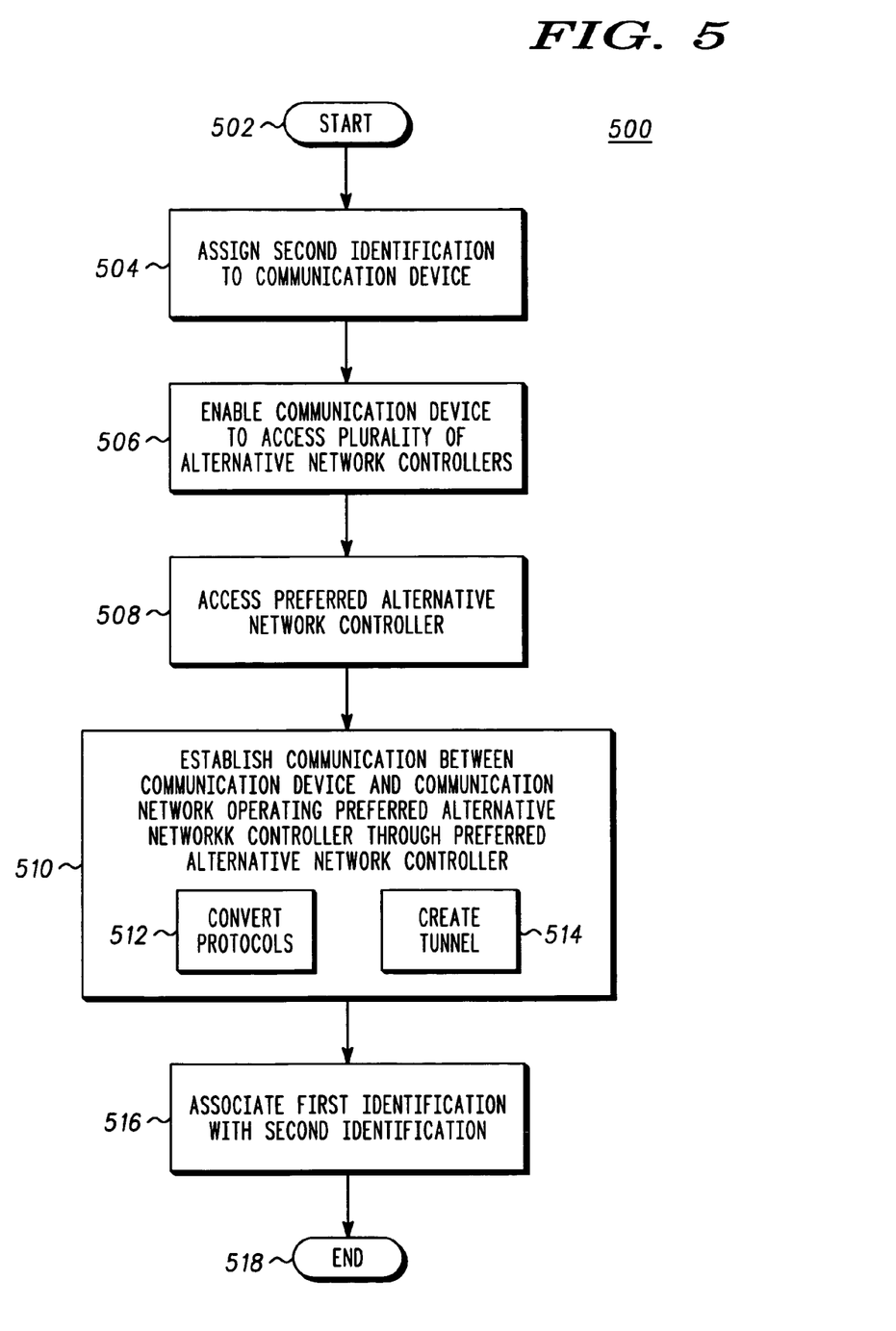
FIG. 5 is an exemplary flowchart illustrating a method in a communication system for providing an access by a communication device to a preferred communication network of a plurality of communication networks in accordance with the present invention.

FIG. 5 is an exemplary flowchart 500 illustrating a method in the communication system 300 for providing an access by the communication device 108 to a preferred communication network through the second communication network 106 in accordance with the present invention. As previously illustrated, the first communication network 102 operates using the cellular core network signaling protocol, and the communication device 108 supports the cellular core network signaling protocol of the first communication network 102, and has the first identification such as an assigned subscriber identity, which is generally used to establish communication with the first communication network 102. The process begins in block 502, and the communication device 108 is assigned a second identification such as an IP address in block 504. The second communication network 106 may assign the second identification to the communication device 108 in response to a request to access the second communication network 106 transmitted from the communication device 108, may authorize the communication device 108 to access the second communication network 106.

Upon assigning the second identification, the second communication network 106 enables the communication device 108 to access the plurality of alternative network controllers 104 and 302 in block 506, and the communication system 300 directs the communication device 108 to access a preferred alternative network controller from the plurality of alternative network controllers 104 and 302 based upon a predetermined condition in block 508. For this example, it is assumed that the alternative network controller 302 meets the predetermined condition and is designated as the preferred alternative network controller. The preferred alternative network controller 302 then establishes communication between the communication device 108 and the third communication network 304, which operates the preferred alternative network controller 302 through the preferred alternative network controller 302 block 510. As shown in block 512 within block 510, the preferred alternative network controller 302 may establish communication by converting a protocol of the second communication network 106 into a cellular core network signaling protocol of the third communication network 304, which is coupled to the preferred alternative network controller 302, and by converting the cellular core network signaling protocol of the third communication network 304 into the protocol of the second communication network 106. As also shown in block 514, the preferred alternative network controller 302 may also establish communication by creating and controlling a tunnel between the communication device 108 and the preferred alternative network controller 302.

The preferred alternative network controller 302 then associates the first identification of the communication device 108 with the second identification of the communication device 108 in block 516. As previously described, this association of the first identification to the second identification enables the communication system 300 to re-direct services originally directed to the first identification of to the second identification of the communication device 108. The preferred alternative network controller 302 may further receive identification information of the second communication network 106 as previously described, and may associate the identification information of the second communication network 106 with the first identification of the communication device 108. The process then terminates in block 418.

Figure 6:
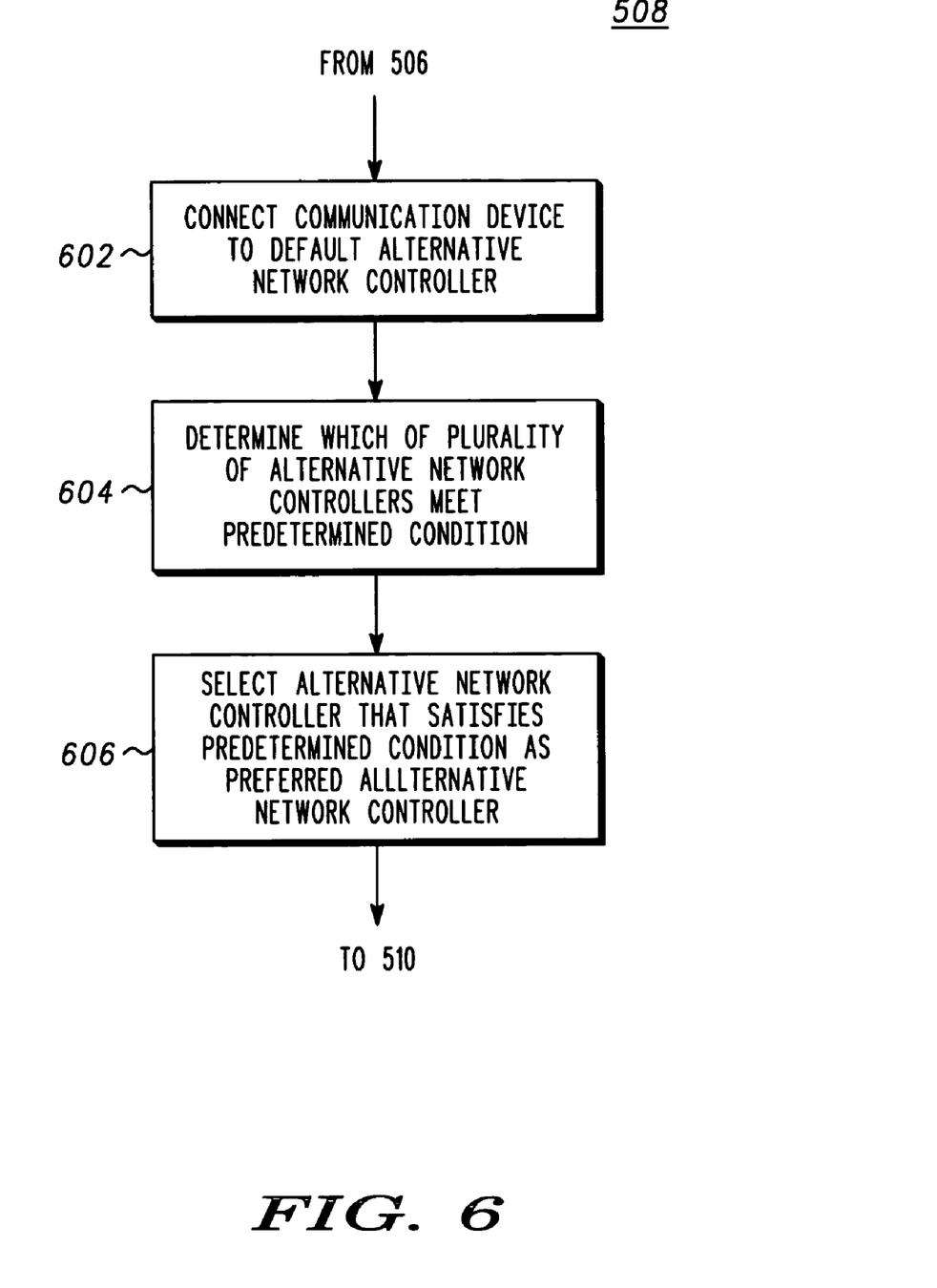
FIG. 6 is an exemplary flowchart further illustrating the process of directing the communication device to access a preferred alternative network controller based upon a predetermined condition.

FIG. 6 is an exemplary flowchart further illustrating block 508 of the process of the communication system 300 directing the communication device 108 to access a preferred alternative network controller based upon a predetermined condition. The communication device 108 is initially connected to a default alternative network controller in block 602. Because the communication device 108 supports the cellular core network signaling protocol of the first communication network 102, the alternative network controller 104, which is connected to and operated by the first communication network 102, may be designated as the default alternative network controller. The default alternative network controller 104 then determines which of the plurality of alternative network controllers satisfies the predetermined condition in block 604, and selects an alternative network controller meeting the predetermined condition as the preferred alternative network controller in block 606.

The predetermined condition used to select a preferred alternative network controller may be one or more of variety of conditions. For example, if the communication device 108 is currently located outside of a coverage area of the first communication network 102 and accessing through the second network 106, but the user of the communication device 108, anticipating to move and to be outside of the second network coverage, desires a cellular coverage by another network, then a preferred alternative network controller operated by a communication network having a cellular coverage of the current location of the communication device 108 may be selected. If the user of the communication device 108 desires a function that is not supported or provided by the communication network operating the default alternative network controller, then an alternative network controller operated by a communication network, which does have the desired function, may be selected as the preferred alternative network controller. The selection of the preferred alternative network controller may be based upon a pre-arranged relationship between the operating communication networks of the plurality of alternative network controllers. It may simply be that the default alternative network controller has reached its maximum traffic capacity, and has to select another alternative network controller.

Figure 7:
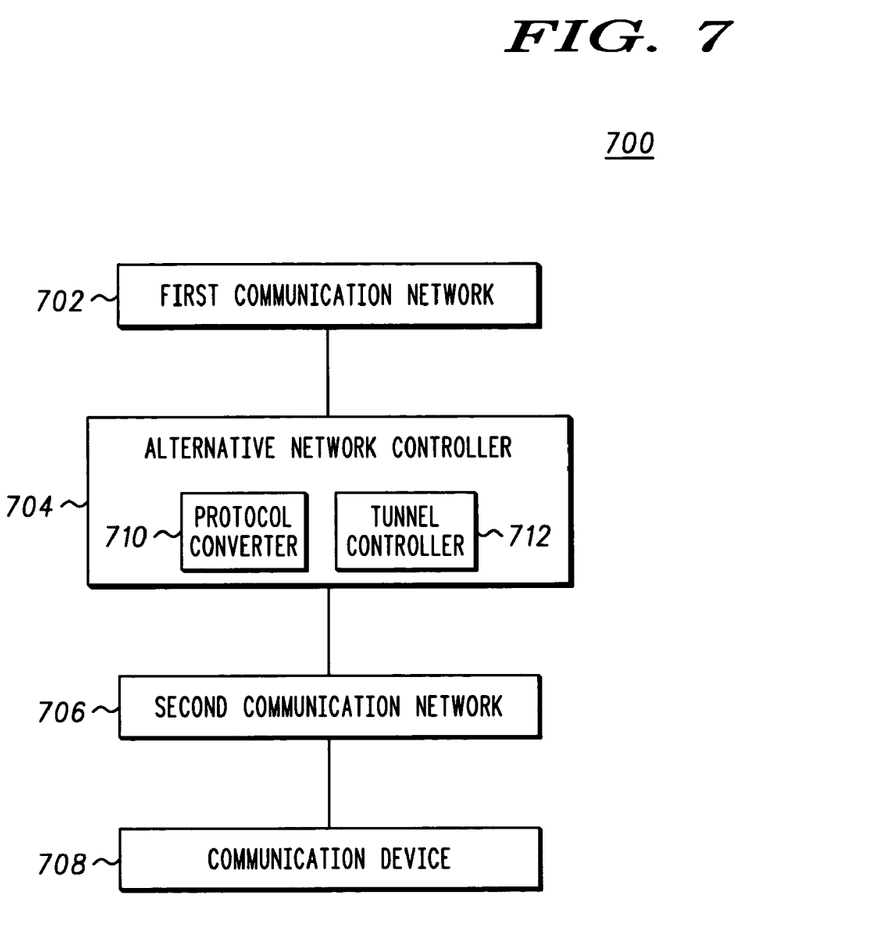
FIG. 7 is an exemplary block diagram of an embodiment in accordance with the present invention of a communication system configured to provide an alternate communication path.

FIG. 7 is an exemplary block diagram of an embodiment of a communication system 700 configured to provide an alternate communication path in accordance with the present invention. The communication system 700 comprises a first communication network 702, which is configured to support a first cellular core network signaling protocol. An alternative network controller 704 is coupled to the first communication network 702, and is configured to communicate with the first communication network 702 using the first cellular core network signaling protocol. A second communication network 706 is coupled to the alternative communication network 704, and is configured to support a second communication network protocol and to communicate with the alternative network controller 704 using the second communication network protocol. The second communication network 706 may be one of many types of networks such as, but not limited to, an unlicensed communication network, a local area network ("LAN"), a wireless local area network ("WLAN"), a wideband network, an infrared network, and a short-range network. A communication device 708 has a first identification and is coupled to the second communication network 706. The communication device 708 is configured to support the first cellular core network signaling protocol and the second communication network protocol, and to receive a second identification from the second communication network 706. The second communication network 706 may be further configured to assign the second identification to the communication device 708 in response to a request from the communication device 708 to access the second communication network 706.

The alternative network controller 704 is further configured to associate the first identification of the communication device 708 with the second identification of the communication device 708, and to establish communication between the communication device 708 and the first communication network 702 through the alternative network controller 704. This association of the first identification to the second identification enables the communication system 700 to re-direct services, originally directed to the first identification, to the second identification of the communication device 708. Such services may include a telephone call, a short message service ("SMS") message, and caller ID. The alternative network controller 704 may further receive identification information of the second communication network 706 such as, but not limited to, a unique identifier, location information, a medium access control ("MAC") identification, a service set identifier ("SSID"), and an IP address, and may associate the identification information of the second communication network 706 with the first identification of the communication device 708. The alternative network controller 704 further comprises a protocol converter 710, which is configured to convert the first cellular communication core network signaling protocol into the second communication network protocol, and to convert the second communication network protocol into the first cellular core network signaling protocols. The alternative network controller 704 may further comprise a tunnel controller 712 configured to set up, maintain, and control a tunnel between the communication device 708 and the alternative network controller 704 to establish communication between the communication device 708 and the first communication network 702.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a communication system for providing an access by a communication device to a first communication network through a second communication network, the communication device having a first identification and supporting a cellular core network signaling protocol of the first communication network, the method comprising:
   assigning a second identification to the communication device;
   enabling the communication device through the second communication network to access an alternative network controller, including enabling access to a default alternative network controller of a plurality of alternative network controllers, wherein each of the plurality of alternative network controllers is operably coupled to a corresponding communication network of a plurality of communication networks, and the default alternative network controller is operably coupled to the first communication network;
   establishing communication between the communication device and the first communication network through the alternative network controller;
   associating the first identification of the communication device with the second identification of the communication device;
   selecting a preferred alternative network controller from the plurality of alternative network controllers based upon a predetermined condition by the default alternative network controller;
   establishing communication between the communication device and a preferred communication network operably coupled to the preferred alternative network controller through the preferred alternative network controller; and
   providing services directed to the first identification of the communication device to the second identification of the communication device.

2. The method of claim 1, wherein the predetermined condition includes at least one of:
   the communication device being located outside of a coverage area of the first communication network;
   the communication device being located within a coverage area of the preferred communication network;
   the first communication network having a pre-arranged relationship with the preferred communication network;
   the preferred alternative network controller having a specific functionality requested by the communication device; and
   the default alternative network control reaching a traffic capacity.

3. The method of claim 1, further comprising:
   receiving identification information of the second communication network by the first communication network upon assigning the second identification to the communication device; and
   associating the identification information of the second communication network with the first identification of the communication device.

4. The method of claim 3, wherein the identification information of the second communication network includes at least one of:
   location information of the second communication network,
   a medium access control identification of the second communication network,
   a service set identifier of the second communication network, and
   an Internet Protocol address of the second communication network.

5. The method of claim 4, wherein the predetermined condition includes at least one of:
   the second communication network being located outside of a coverage area of the first communication network; and
   the second communication network being located within a coverage area of the preferred communication network.

6. The method of claim 1, wherein establishing communication between the communication device and the preferred communication network comprises:
   converting a protocol of the second communication network into a cellular core network signaling protocol of the preferred communication network, and
   converting the cellular core network signaling protocol of the preferred communication network into the protocol of the second communication network.

7. The method of claim 1, wherein establishing communication between the communication device and the preferred cellular communication network includes setting up and controlling a tunnel between the communication device and the preferred alternative network controller.

8. The method of claim 1, wherein the second communication network is one of:
   an unlicensed communication network,
   a local area network,
   a wireless local area network
   a wideband network, an infrared network, and
a short-range network.

9. A method in a communication system for providing an access by a communication device to a first communication network through a second communication network, the communication device having a first identification and supporting a cellular core network signaling protocol of the first communication network, the method comprising:

assigning a second identification to the communication device;

enabling the communication device through the second communication network to access an alternative network controller;

establishing communication between the communication device and the first communication network through the alternative network controller; and associating the first identification of the communication device with the second identification of the communication device;

directing the communication device to access a preferred communication network from a plurality of communication networks operably coupled to the alternative communication controller based upon a predetermined condition;

establishing communication between the communication device and the preferred communication network through the alternative network controller; and providing services directed to the first identification of the communication device to the second identification of the communication device.

10. The method of claim 9, wherein the predetermined condition includes at least one of:

the communication device being located outside of a coverage area of the first communication network;

the communication device being located within a coverage area of the preferred communication network;

the first communication network having a pre-arranged relationship with the preferred communication network;

the preferred communication network having a specific functionality requested by the communication device; and the first communication network reaching a traffic capacity through the alternative network controller.

11. The method of claim 9, further comprising:

receiving identification information of the second communication network by the first communication network upon assigning the second identification to the communication device; and associating the identification information of the second communication network with the first identification of the communication device.

12. The method of claim 11, wherein the identification information of the second communication network includes at least one of:

location information of the second communication network, a medium access control identification of the second communication network, a service set identifier of the second communication network, and an Internet Protocol address of the second communication network.

13. The method of claim 12, wherein the predetermined condition includes at least one of:

the second communication network being located outside of a coverage area of the first communication network; and the second communication network being located within a coverage area of the preferred communication network.

14. The method of claim 9, wherein establishing communication between the communication device and the preferred communication network through the alternative network controller comprises:

converting a protocol of the second communication network into a cellular core network signaling protocol of the preferred communication network, and converting the cellular core network signaling protocol of the preferred communication network into the protocol of the second communication network.

15. The method of claim 9, wherein establishing communication between the communication device and the preferred cellular communication network through the alternative network controller includes setting up and controlling a tunnel between the communication device and the alternative network controller.

16. The method of claim 9, wherein the second communication network is one of:

an unlicensed communication network,
a local area network,
a wireless local area network
a wideband network,
an infrared network, and
a short-range network.

* * * * *